(12) United States Patent
Fakler et al.

(10) Patent No.: US 8,386,142 B2
(45) Date of Patent: *Feb. 26, 2013

(54) HYBRID DRIVE MOTOR VEHICLE CONTROL SYSTEM COMPRISING DISTRIBUTED FUNCTIONAL COMPONENTS FOR CONTROLLING HYBRID DRIVE OPERATING STATUS

(75) Inventors: Winfried Fakler, Eriskirch (DE); Notker Amann, Friedrichshafen (DE); Christian Mittelberger, Ravensburg (DE); Mesut Er, Friedrichshafen (DE); Stefan Blattner, Vogt (DE); Johannes Kaltenbach, Friedrichshafen (DE); Stefan Wallner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 333 days.

This patent is subject to a terminal disclaimer.

(21) Appl. No.: 12/739,232

(22) PCT Filed: Oct. 16, 2008

(86) PCT No.: PCT/EP2008/063934
§ 371 (c)(1),
(2), (4) Date: Apr. 22, 2010

(87) PCT Pub. No.: WO2009/053292
PCT Pub. Date: Apr. 30, 2009

(65) Prior Publication Data
US 2010/0304925 A1    Dec. 2, 2010

(30) Foreign Application Priority Data
Oct. 24, 2007 (DE) .......................... 10 2007 050 771

(51) Int. Cl.
*B60W 10/02* (2006.01)

(52) U.S. Cl. ........ 701/67; 701/22; 701/102; 180/65.265; 180/65.275; 180/65.28; 180/65.285; 180/65.29; 477/3; 477/5; 903/930; 903/946; 700/4

(58) Field of Classification Search ....................... 700/4
See application file for complete search history.

(56) References Cited

U.S. PATENT DOCUMENTS 5,815,824 A   9/1998 Saga et al.
5,979,257 A   11/1999 Lawrie
(Continued)

FOREIGN PATENT DOCUMENTS

DE   199 23 277 A1   12/1999
DE   199 30 391 A1   1/2000
(Continued)

OTHER PUBLICATIONS

Schilke et al., Integrated Vehicle Control, 1988, International Congress on Transportation Electronics (Convergence '88), pp. 97-106.*

*Primary Examiner* — Thomas Black
*Assistant Examiner* — Peter D Nolan
(74) *Attorney, Agent, or Firm* — Davis & Bujold, PLLC

(57) ABSTRACT

A motor vehicle control system for controlling a motor vehicle with a hybrid drive comprising an internal combustion engine and an electric motor, with a strategy sub-component, a control sub-component and an actuator sub-component. The functional components include at least an internal combustion engine functional component, a transmission functional component, such that the strategy sub-component (8) of the hybrid functional component (4) comprises an operating status prescription module which determines a prescribed value for the operating status of the hybrid drive and transmits the prescribed value to the control sub-component (9) of the hybrid functional component (4) such that the control sub-component (9) of the hybrid functional component (4) comprises a first module (18) and a second module (23).

10 Claims, 2 Drawing Sheets

U.S. PATENT DOCUMENTS

| | | | |
|---|---|---|---|
| 6,083,139 A | 7/2000 | Deguchi et al. | |
| 6,223,106 B1 * | 4/2001 | Yano et al. | 701/22 |
| 6,321,143 B1 * | 11/2001 | Phillips et al. | 701/22 |
| 6,360,152 B1 * | 3/2002 | Ishibashi et al. | 701/48 |
| 6,638,195 B2 * | 10/2003 | Williams | 477/5 |
| 6,735,502 B2 * | 5/2004 | Phillips et al. | 701/22 |
| 6,810,314 B2 * | 10/2004 | Tashiro et al. | 701/48 |
| 6,898,500 B2 * | 5/2005 | Kobayashi | 701/48 |
| 6,973,383 B2 * | 12/2005 | Mitsutani et al. | 701/112 |
| 7,017,692 B2 | 3/2006 | Grassl et al. | |
| 7,047,117 B2 * | 5/2006 | Akiyama et al. | 701/48 |
| 7,072,751 B2 * | 7/2006 | Shimizu | 701/36 |
| 7,198,123 B2 * | 4/2007 | Imazu et al. | 180/65.25 |
| 7,219,756 B2 * | 5/2007 | Bischoff | 180/65.285 |
| 7,219,757 B2 * | 5/2007 | Tomita et al. | 180/65.275 |
| 7,274,981 B2 * | 9/2007 | Eriksson | 701/37 |
| 7,317,978 B2 * | 1/2008 | Ashizawa et al. | 701/54 |
| 7,407,026 B2 * | 8/2008 | Tamor | 180/65.28 |
| 7,537,542 B2 * | 5/2009 | Cawthorne et al. | 477/3 |
| 7,568,994 B2 * | 8/2009 | Heap | 477/3 |
| 7,691,026 B2 * | 4/2010 | Heap et al. | 477/3 |
| 7,739,013 B2 * | 6/2010 | Ishio et al. | 701/48 |
| 7,766,107 B2 * | 8/2010 | Joe et al. | 180/65.21 |
| 7,826,941 B2 * | 11/2010 | Hayashi et al. | 701/22 |
| 7,878,281 B2 * | 2/2011 | Tanishima | 180/65.265 |
| 7,983,823 B2 * | 7/2011 | Heap | 701/51 |
| 8,167,066 B2 * | 5/2012 | Joos et al. | 180/65.265 |
| 2003/0098187 A1 | 5/2003 | Phillips et al. | |
| 2005/0023055 A1 * | 2/2005 | Imazu et al. | 180/65.2 |
| 2005/0049722 A1 * | 3/2005 | Kobayashi | 700/9 |
| 2006/0048516 A1 | 3/2006 | Tenbrock et al. | |
| 2006/0048988 A1 | 3/2006 | Dreibholz et al. | |
| 2007/0056783 A1 | 3/2007 | Joe et al. | |

FOREIGN PATENT DOCUMENTS

| | | |
|---|---|---|
| DE | 102006016810 * | 10/2007 |
| EP | 0 925 979 A2 | 6/1999 |
| EP | 1 762 417 A1 | 3/2007 |
| WO | 02/26520 A1 | 4/2002 |
| WO | 2007/107361 A1 | 9/2007 |
| WO | 2009/053292 A1 | 4/2009 |

* cited by examiner

HYBRID DRIVE MOTOR VEHICLE CONTROL SYSTEM COMPRISING DISTRIBUTED FUNCTIONAL COMPONENTS FOR CONTROLLING HYBRID DRIVE OPERATING STATUS

This application is a National Stage completion of PCT/EP2008/063934 filed Oct. 16, 2008, which claims priority from German patent application serial no. 10 2007 050 771.4 filed Oct. 24, 2007.

FIELD OF THE INVENTION

The invention concerns a motor vehicle control system for controlling a motor vehicle with a hybrid drive comprising an internal combustion engine and an electric motor.

BACKGROUND OF THE INVENTION

A motor vehicle control system has a number of functional components, for example, an internal combustion engine functional component, a transmission functional component, a brake functional component and a battery functional component, such that the individual functional components acting in coordination ensure the correct operation of the motor vehicle. A motor vehicle control system, for controlling a motor vehicle with a hybrid drive, additionally requires a hybrid functional component.

In motor vehicle control systems known from the prior art, the individual functional components exchange information or data via data buses, and are coordinated by a central coordination device. This creates a hierarchic, tree-like structure for the motor vehicle control system, but the said hierarchic tree-like structure requires a powerful central coordination device by means of which all the communications between the individual functional components can be handled.

SUMMARY OF THE INVENTION

Starting from there, the present invention addresses the problem of providing a new type of motor vehicle control system for controlling a motor vehicle with a hybrid drive comprising an internal combustion engine and an electric motor.

The motor vehicle control system, according to the invention, comprises a plurality of functional components divided into at least three sub-components, namely, a strategy sub-component, a control sub-component and an actuator sub-component, to be specific at least an internal combustion engine functional component for controlling the internal combustion engine, a transmission functional component for controlling a transmission and a hybrid functional component for controlling the electric motor and a clutch connected between the internal combustion engine and the electric motor, such that the strategy sub-component of the hybrid functional component comprises an operating status prescription module which determines a prescribed value for the operating status of the hybrid drive and transmits the said prescribed value to the control sub-component of the hybrid functional component; the control sub-component of the hybrid functional component comprises a first module which, from the prescribed value provided by the operating status prescription module for the operating status, generates a target value for a drivetrain condition of the hybrid drive. The control sub-component of the hybrid functional component also comprises a second module which, on the basis of the said target value for the drivetrain condition, selects at least one operative function module which contains control sequences for implementing the target value for the condition of the drivetrain.

The strategy sub-component of the hybrid functional component of the motor vehicle control system comprises at least two modules, namely, a first module which, from the prescribed value for the operating status of the hybrid drive provided by the operating status prescription module of the strategy sub-component, generates a target value for a drivetrain condition of the hybrid drive, and a second module which, on the basis of the said target value for the drivetrain condition, selects at least one operative function module of the control sub-component that contains control sequences for implementing the target value for the condition of the drivetrain.

The prescribed value provided by the strategy sub-component for the operating status of the hybrid drive is an abstract prescribed value, which is independent of the drivetrain configuration and is verified in the first module of the control sub-component in order to generate a drivetrain-configuration-dependent target value for the drivetrain condition. The target value for the drivetrain condition is preferably a series of drivetrain conditions so that. starting from a current actual value of the drivetrain condition, the prescribed operating status can be reached. On the basis of the drivetrain condition target value provided by the first module, in particular on the basis of the said series of drivetrain conditions, the second module selects a series of operative function modules in order to implement the target value for the drivetrain condition. By virtue of this structure of the strategy sub-component of the hybrid functional component, the target value for the drivetrain condition is thus introduced as an intermediate parameter in order to ensure a step-by-step or graded concretization of control functions. This reduces the complexity of the motor vehicle control system.

BRIEF DESCRIPTION OF THE DRAWINGS

Preferred further developments of the invention emerge from the subordinate claims and from the description provided below. Example embodiments of the invention, to which it is not limited, are explained in greater detail with reference to the drawing, which shows:

DETAILED DESCRIPTION OF THE PREFERRED EMBODIMENTS

Figure 1:
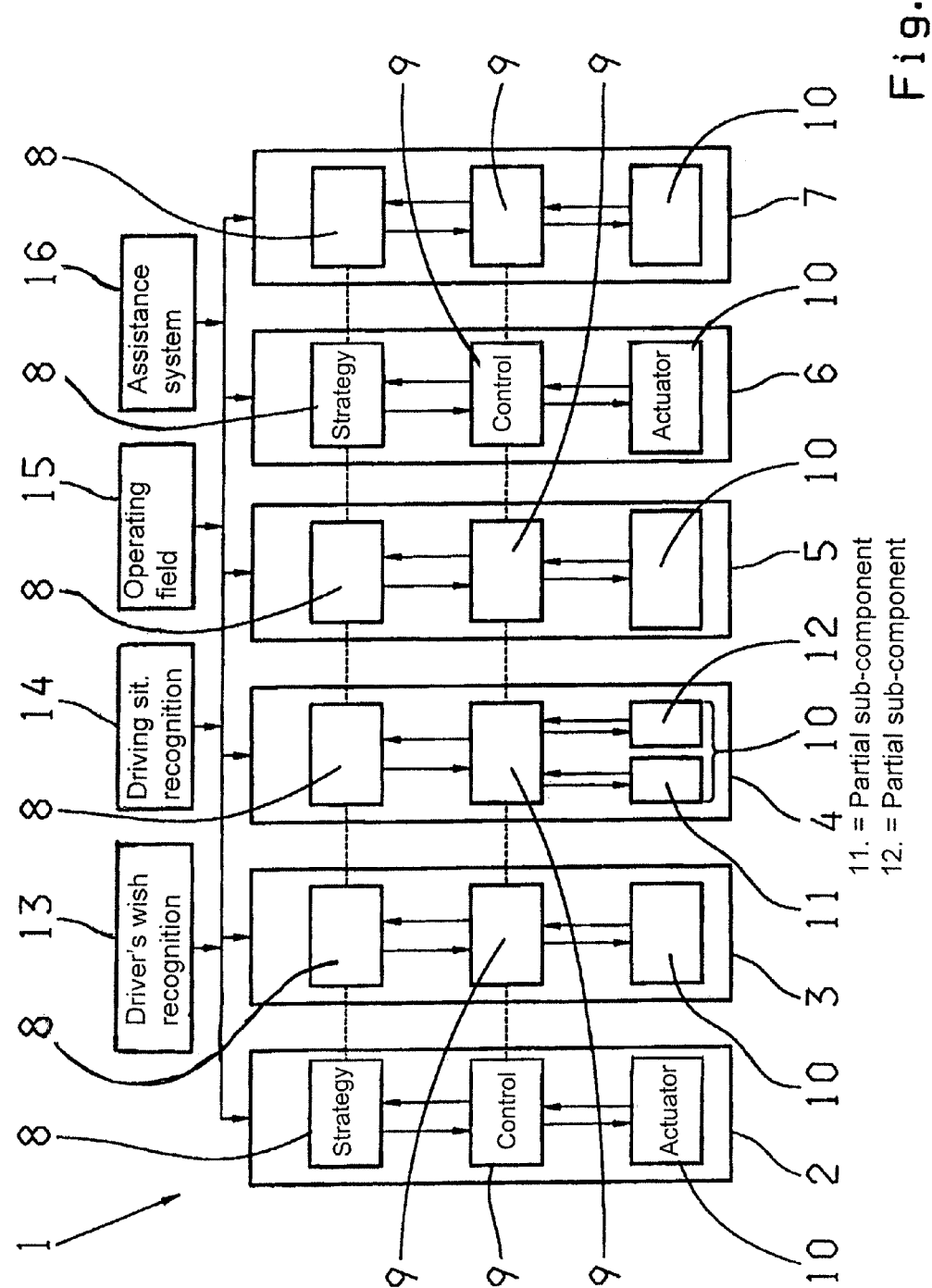
FIG. 1: A schematic block circuit diagram of a motor vehicle control system, according to the invention, for controlling a motor vehicle with a hybrid drive that comprises a motor vehicle and an electric motor.

FIG. 1 shows a schematic block circuit diagram of a motor vehicle control system 1, according to the invention, for controlling a motor vehicle with a hybrid drive that comprises a motor vehicle and an electric motor. The motor vehicle control system 1 comprises a plurality of functional components 2, 3, 4, 5, 6 and 7 each divided into three sub-components, such that each of the functional components 2 to 7 is divided into a strategy sub-component 8, a control sub-component 9 and an actuator sub-component 10.

In the example embodiment shown in FIG. 1, these functional components, divided into at least three sub-components, are, respectively, an internal combustion engine functional component 2 for controlling the internal combustion engine, a transmission functional component 3 for controlling a transmission, a hybrid functional component 4 for controlling the electric motor and a clutch connected between the internal combustion engine and the electric motor, a battery functional component 5 for controlling a battery, a brake functional component 6 for controlling a brake system and a retarder functional component 7 for controlling a retarder.

All of the functional components 2 to 7 are divided into three sub-components 8, 9 and 10 but the actuator sub-component 10 of the hybrid functional component 4 is subdivided into two part-sub-components, namely, one part-sub-component 11 for the electric motor and one part-sub-component 12 for the clutch connected between the electric motor and the internal combustion engine.

Specific tasks or functions are assigned to the sub-components 8 to 10 of the functional components 2 to 7.

Thus, the strategy sub-component 8 of each functional component 2 to 7 at least serves to determine at least one prescribed value for the respective functional component 2 to 7, namely, for the control sub-component 9 of the respective functional component 2 to 7. In addition, the strategy sub-component 8 of each functional component 2 to 7 serves to determine data for influencing the strategy sub-component 8 of at least one other functional component and the control sub-component 9 of at least one other functional component.

The control sub-component 9 of each functional component 2 to 7 serves to check the, or each, prescribed value provided by the strategy sub-components 8 of the respective functional components 2 to 7 and thereby to determine at least one target value for the respective functional components. In addition, the control sub-component 9 of each functional component 2 to 7 serves to determine data for influencing the strategy sub-component 8 and/or the control sub-component 9 of at least one other functional component. Furthermore, the control sub-component 9 preferably serves to feed back at least one current actual parameter value to the strategy sub-component 8 of the respective functional component.

The actuator sub-component 10, of each functional component 2 to 7, at least serves to implement the, or each, target value and to feed back at least one current actual parameter value to the control sub-component 9 of the respective functional component 2 to 7.

In addition to the functional components 2 to 7 divided into three sub-components, the motor vehicle control system 1 of FIG. 1 comprises a plurality of functional components 13, 14, 15 and 16, which form an environment of the functional components 2 to 7.

In FIG. 1, the functional components 13, 14, 15 and 16, that form the environment of the functional elements 2 to 7, consist of a driver's wish recognition functional component 13 which deduces a desired torque or a wish for sporty response on the basis of an accelerator pedal actuation and/or a brake pedal actuation, a driving situation recognition functional component 14, which deduces that the motor vehicle is driving round a curve and/or on an inclined road on the basis of transverse acceleration sensors and inclination sensors in the motor vehicle, an operating field function unit 15, which interrogates the selector lever and the operating elements of a transmission and/or a retarder, and an assistance system functional component 16, which prescribes a torque and/or a speed.

The strategy sub-component 8 of the hybrid functional component 4 comprises at least a torque prescription module and an operating status prescription module. The torque prescription module serves to determine a recommended value for the torque distribution of a torque desired by the driver between the internal combustion engine and the electric motor of the hybrid drive. The operating status prescription module serves to determine a prescribed value for the operating status of the hybrid drive.

The prescribed values provided by the strategy sub-component of the hybrid functional component 4 are abstract prescribed values unrelated to any specific configuration of a motor vehicle drivetrain. For example, the value prescribed by the operating status prescription module of the strategy sub-component 8 of the hybrid functional component 4 for the operating status of the hybrid drive or of the motor vehicle, is independent of the drivetrain configuration. Only in the control sub-component 9 of the hybrid functional component 4 is the still abstract prescribed value for the operating status of the hybrid drive made concrete and linked to the specific configuration of the drivetrain. This is described with reference to FIG. 2.

Figure 2:
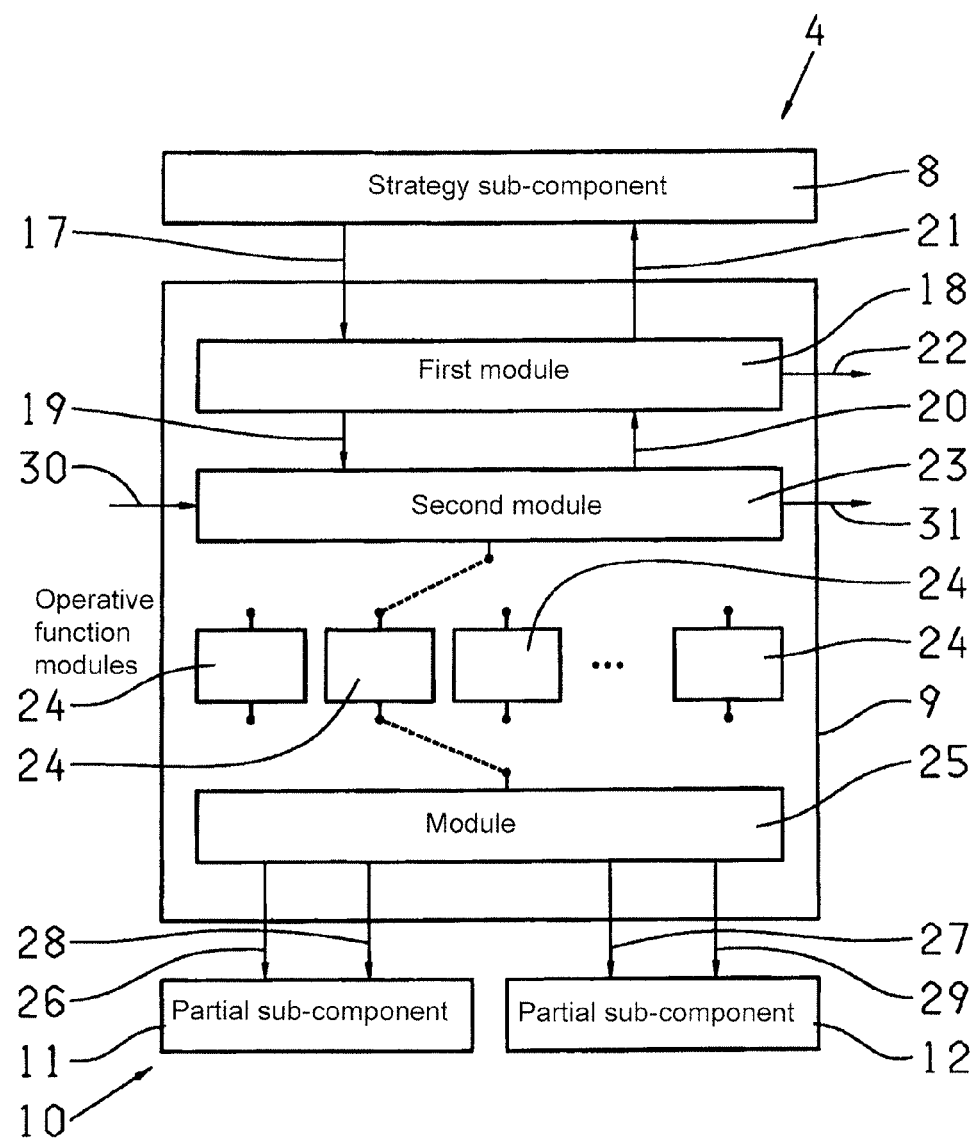
FIG. 2: A block circuit diagram of a detail of the motor vehicle control system according to the invention.

Thus, FIG. 2 shows details of the control sub-component 9 of the hybrid functional component 4, which concerns the step-by-step concretization of the value 17 prescribed by the strategy sub-component 8 for the operating status of the hybrid drive. In a first module 18 of the control sub-component 9 of the hybrid functional component 4, a target value 19 for a drivetrain condition of the hybrid drive is generated from the prescribed value 17 provided for the operating status of the hybrid drive, and this production of the said target value 19 for the drivetrain condition not only depends on the value 17 prescribed for the operating status, but also on a current actual value 20 of the drivetrain condition. As the target value 19 for the drivetrain condition of the hybrid drive the first module 18 preferably produces a series of drivetrain conditions which depends on the specific configuration of the drivetrain, in order, starting from the said actual value 20 of the drivetrain condition, to reach the target value 19 for the drivetrain condition and, therefore, the prescribed value 17 for the operating status of the hybrid drive. As shown in FIG. 2, the first module 18 transmits a current actual value 21 of the operating status to the strategy sub-component 8 of the hybrid functional component 4. In addition, the first module 18 can serve to generate at least one target value 22 for some other functional component of the motor vehicle control system, for example, to generate a target value for the internal combustion engine functional component 2 of the motor vehicle control system 1.

The target value provided by the first module 18 for the drivetrain condition, which preferably comprises a series of drivetrain conditions, is used in a second module 23 to select at least one operative function module 24 that contains control sequences for implementing the target value 19 for the drivetrain condition. On the basis of the series of drivetrain conditions provided by the first module 18, the second module 23 selects a series of operative function modules 24 finally in order to implement the target value for the drivetrain condition.

In particular, the operative function modules 24 can be a function module for a direct start of the internal combustion engine, a function module for coupling the internal combustion engine to the electric motor, a function module for decoupling the internal combustion engine from the electric motor, a function module for driving under electric motor power alone, and a function module for hybrid driving. The above-mentioned operative function modules are only examples. Of course, other or even additional operative function modules 24 can be present.

On the basis of the operative function modules 24 and the control sequences thereof, in a module 25 of the control sub-component of the hybrid functional component, a series of control signals for the actuator sub-component of the hybrid functional component 4 is held in readiness, namely, on the one hand control signals 26 for the partial sub-component 11 and control signals for the partial sub-component 12 of the actuator sub-component 10. Current actual values 28 and 29 of the partial sub-components 11, 12 are supplied by them to the control sub-component 9 of the hybrid functional component 4.

As can be seen from FIG. 2, the operative function modules 24 are selected not only on the basis of the target value 19 for the drivetrain condition, but rather, having regard to further target values 30 of other functional components as well, for example, at least one target value of the internal combustion engine functional component 2 and/or at least one target value of the transmission functional component 3 can be taken into account. Furthermore, as shown in FIG. 2, the second module 23 of the hybrid functional component 4 can generate control signals 31 for other functional components of the motor vehicle control system.

In the context of the present invention, the strategy sub-component 8 of the hybrid functional component 4 accordingly transmits a strategic prescribed value 17 for an operating status of the hybrid drive, which is independent of the specific drivetrain configuration of the motor vehicle, to the control sub-component 9 of the hybrid functional component 4, and from this strategic prescribed value 17 the first module 18 generates a target value 19 which, this time, does depend on the specific drivetrain configuration, for a drivetrain condition. The said target value 19 is preferably a series of drivetrain conditions with the help of which the target value 19 for the drivetrain condition can be reached as a function of the current actual value 20 of the drivetrain condition. Accordingly, as the initial value, the first module 18 provides at least the target value 19 of the drivetrain condition. In addition, it can emit further target values 22 for other functional modules of the motor vehicle control system.

In the second module 23, at least one operative function module 24 is selected, which contains the necessary control sequences for providing the target value for the drivetrain condition, on the basis of the target value of the drivetrain condition. The said second module of the control sub-component 9 of the hybrid functional component 4 can also exchange data with other functional components of the motor vehicle control system according to the invention.

Thus, in the two modules 18 and 23 of the control sub-component 9 of the hybrid functional component 4, the value 17 prescribed by the strategy sub-component 8, which is independent of the specific drivetrain configuration of the motor vehicle, is concretized step by step in such a manner that a series of drivetrain conditions are produced in the first module 18, which do depend on the drivetrain configuration.

In the second module 23, a series of operative function modules 24 and, therefore, a series of control sequences are selected, in order to move through the individual drivetrain conditions in succession and ultimately to arrive at the prescribed value for the operating status.

By virtue of a step-by-step concretization within the motor vehicle control system according to the invention, its complexity is reduced and, furthermore, the clarity, comprehensibility, robustness against defects and testability of the motor vehicle control system according to the invention are improved. A further advantage is that the motor vehicle control system, according to the invention, can be adapted and modified more easily. Moreover, control functions and sequences can be interrupted more easily. Furthermore, no central coordination device is required.

INDEXES

1 Motor vehicle control system
2 Internal combustion engine functional component
3 Transmission functional component
4 Hybrid functional component
5 Battery functional component
6 Brake functional component
7 Retarder functional component
8 Strategy sub-component
9 Control sub-component
10 Actuator sub-component
11 Partial sub-component
12 Partial sub-component
13 Functional component for recognizing the driver's intention
14 Functional component for recognizing the driving situation
15 Operating field functional component
16 Assistance system functional component
17 Prescribed value for the operating status
18 First module
19 Target value for the drivetrain condition
20 Current actual value of the drivetrain condition
21 Current actual value of the operating status
22 Target value
23 Second module
24 Operative function module
25 Module
26 Control signal
27 Control signal
28 Current actual value
29 Current actual value
30 Target value
31 Control signal

The invention claimed is:
1. A motor vehicle control system for controlling a motor vehicle with a hybrid drive comprising an internal combustion engine and an electric motor, the vehicle control system comprising:
a plurality of functional components, each divided into at least three sub-components, and the three sub-components comprising a strategy sub-component (8), a control sub-component (9) and an actuator sub-component (10);
the plurality of the functional components including at least
an internal combustion engine functional component (2) for controlling the internal combustion engine,
a transmission functional component (3) for controlling a transmission, and
a dedicated hybrid functional component (4) for controlling only the electric motor and a clutch connected between the internal combustion engine and the electric motor;
the strategy sub-component (8) of the hybrid functional component (4) comprises an operating status prescription module which determines a prescribed value for the operating status of the hybrid drive and transmits the prescribed value to the control sub-component (9) of the hybrid functional component (4); and
the control sub-component (9) of the hybrid functional component (4) comprises a first module (18), a second module (23), and at least one operative function module (24);
wherein the first module (18) generates a target value for a drivetrain condition of the hybrid drive from the value for the operating status of the hybrid drive prescribed by the operating status prescription module;
the second module (23) selects at least one operative function module, which contains control sequences for implementing the target value for the drivetrain condition, on the basis of the value prescribed for the drivetrain condition;

the strategy sub-component of each other functional component determines at least one prescribed value for the control sub-component of the respective functional component, and determines data for influencing the strategy sub-component of at least one other functional component and the control sub-component of at least one other functional component;

the control sub-component, of each other functional component, checks each prescribed value provided by the strategy sub-components of the respective functional components and determines at least one target value for the respective functional components, and determines data for influencing one of the strategy sub-component for the respective functional component and the control sub-component of at least one other functional component, and the sub-component serves to feed back at least one current actual parameter value to the strategy sub-component of the respective functional component; and the actuator sub-component, of each functional component, implements each target value, and feeds back at least one current actual parameter value to the control sub-component of the respective functional component.

2. The motor vehicle control system according to claim 1, wherein the actuator sub-component (10) of the hybrid functional component (4) actuates the electric motor and the clutch connected between the electric motor and the internal combustion engine.

3. The motor vehicle control system according to claim 1, wherein the actuator sub-component of the hybrid functional component actuates only the electric motor and the clutch connected between the electric motor and the internal combustion engine.

4. A motor vehicle control system for controlling a motor vehicle with a hybrid drive comprising an internal combustion engine and an electric motor, the vehicle control system comprising:

a plurality of functional components, each divided into at least three sub-components, and the three sub-components comprising a strategy sub-component (8), a control sub-component (9) and an actuator sub-component (10), the plurality of the functional components including at least an internal combustion engine functional component (2) for controlling the internal combustion engine, a transmission functional component (3) for controlling a transmission, and a hybrid functional component (4) for controlling both the electric motor and a clutch connected between the internal combustion engine and the electric motor;

the strategy sub-component (8) of the hybrid functional component (4) comprises an operating status prescription module which determines a prescribed value for the operating status of the hybrid drive and transmits the prescribed value to the control sub-component (9) of the hybrid functional component (4); and the control sub-component (9) of the hybrid functional component (4) comprises a first module (18), a second module (23), and at least one operative function module (24);

wherein the first module (18) generates a target value for a drivetrain condition of the hybrid drive from the value for the operating status of the hybrid drive prescribed by the operating status prescription module;

the second module (23) selects at least one operative function module, which contains control sequences for implementing the target value for the drivetrain condition, on the basis of the value prescribed for the drivetrain condition; and the first module (18) generates the target value for the drivetrain condition of the hybrid drive from the value prescribed by the operating status prescription module for the drivetrain condition of the hybrid drive, and from a current actual value of the drivetrain condition provided by the second module (23).

5. The motor vehicle control system according to claim 4, wherein the first module (18) determines a series of drivetrain conditions, as the target value for the drivetrain condition of the hybrid drive, such that starting from the current actual drivetrain condition value, the value prescribed for the operating status of the hybrid drive is reached.

6. The motor vehicle control system according to claim 5, wherein on a basis of the series of drivetrain conditions provided by the first module (18), the second module (23) selects a series of operative function modules (24) for implementing the target value for the drivetrain condition.

7. The motor vehicle control system according to claim 6, wherein the second module (23) selects the operative function modules (24) on the basis of the target value for the drivetrain condition and on the basis of current actual values supplied by the actuator sub-component (10) of the hybrid functional component (4).

8. The motor vehicle control system according to claim 5, wherein the second module (23) selects at least one operative function module (24) on the basis of the target value for the drivetrain condition and on the basis of current actual values supplied by the actuator sub-component (10) of the hybrid functional component (4).

9. The motor vehicle control system according to claim 4, wherein the second module (23) selects at least one operative function module (24) on the basis of the target value for the drivetrain condition and on the basis of current actual values supplied by the actuator sub-component (10) of the hybrid functional component (4).

10. A motor vehicle control system for controlling a motor vehicle with a hybrid drive comprising an internal combustion engine and an electric motor, the vehicle control system comprising:

a plurality of functional components, each divided into at least three sub-components, and the three sub-components comprising a strategy sub-component (8), a control sub-component (9) and an actuator sub-component (10), the plurality of the functional components including at least an internal combustion engine functional component (2) for controlling the internal combustion engine, a transmission functional component (3) for controlling a transmission, and a hybrid functional component (4) for controlling both the electric motor and a clutch connected between the internal combustion engine and the electric motor;

the strategy sub-component (8) of the hybrid functional component (4) comprises an operating status prescription module which determines a prescribed value for the operating status of the hybrid drive and transmits the prescribed value to the control sub-component (9) of the hybrid functional component (4);

the control sub-component (9) of the hybrid functional component (4) comprises a first module (18), a second module (23), and at least one operative function module (24);

wherein the first module (18) generates a target value for a drivetrain condition of the hybrid drive from the value for the operating status of the hybrid drive prescribed by the operating status prescription module;

the second module (23) selects at least one operative function module, which contains control sequences for implementing the target value for the drivetrain condition, on the basis of the value prescribed for the drivetrain condition; and the second module (23) selects at least one operative function module (24) on the basis of the target value for the drivetrain condition and on the basis of current actual values supplied by the actuator sub-component (10) of the hybrid functional component (4).

* * * * *